(12) United States Patent
Hashimoto et al.

(10) Patent No.: US 6,765,327 B2
(45) Date of Patent: Jul. 20, 2004

(54) INTEGRAL DRIVELINE SUPPORT AND ELECTRIC MOTOR

(75) Inventors: Fukuo Hashimoto, North Canton, OH (US); Rao-Sheng Zhou, Canton, OH (US)

(73) Assignee: The Timken Company, Canton, OH (US)

( * ) Notice: Subject to any disclaimer, the term of this patent is extended or adjusted under 35 U.S.C. 154(b) by 41 days.

(21) Appl. No.: 10/107,894

(22) Filed: Mar. 27, 2002

(65) Prior Publication Data

US 2003/0184173 A1 Oct. 2, 2003

(51) Int. Cl.[7] ................................................ H02K 7/09
(52) U.S. Cl. ........................................ 310/90; 310/268
(58) Field of Search ............................ 310/90, 89, 268, 310/91

(56) References Cited

U.S. PATENT DOCUMENTS

| | | | |
|---|---|---|---|
| 2,730,953 A | | 1/1956 | Pensabene |
| 3,566,165 A | * | 2/1971 | Lohr ........................ 310/67 R |
| 4,402,374 A | | 9/1983 | Knur et al. |
| 4,823,039 A | | 4/1989 | Lynch |
| 4,853,567 A | | 8/1989 | Muramatsu et al. |
| 5,472,059 A | | 12/1995 | Schlosser et al. |
| 5,532,535 A | | 7/1996 | Oltmanns |
| 5,844,338 A | * | 12/1998 | Horski ........................ 310/90 |

FOREIGN PATENT DOCUMENTS

| | | |
|---|---|---|
| JP | 07017425 | 7/1993 |
| JP | 07096752 | 9/1993 |
| JP | 10053131 | 8/1996 |
| JP | 10258642 | 3/1998 |

OTHER PUBLICATIONS

Patent abstracts of Japan; vol. 009, No. 106 (E–313), May 10, 1985 & JP 59 230446 A (Matsushita Denki Sangyo KK), Dec. 25, 1984 abstract.

* cited by examiner

Primary Examiner—Thanh Lam
(74) Attorney, Agent, or Firm—Polster, Lieder, Woodruf & Lucchesi, L.C.

(57) ABSTRACT

The present disclosure provides an assembly including an electric motor within an electric motor case and a driveline support. The electric motor includes at least one stator and a rotor. The rotor is connected to a rotor shaft. The vehicle support includes a hub rotatably attached to a housing by a package bearing. The electric motor case is attached to the housing and supports the stator. The rotor shaft is attached to the hub and supported solely by the package bearing of the driveline support. A shoulder portion of the rotor shaft abuts an end of the hub such that a desired air gap is maintained between the rotor and the stator.

27 Claims, 4 Drawing Sheets

US 6,765,327 B2

INTEGRAL DRIVELINE SUPPORT AND ELECTRIC MOTOR

FIELD OF THE INVENTION

The present invention relates generally to a driveline support assembly and, more particularly, to a driveline support assembly utilizing an electric motor wherein the driveline support and the electric motor utilize only a single package bearing.

BACKGROUND OF THE INVENTION

A variety of driveline support assemblies are known in the art that utilize electric motors to power a driveline when accelerating or maintaining driveline motion or to generate electricity from the driveline's kinetic energy when decelerating. In the past, these systems have used separate bearings for the electric motor and the driveline support. However, using separate bearings only adds the cost and weight of the assembly and causes the assembly to be less compact. The present invention solves this problem by reducing the number of bearings required in order to make the driveline support assembly lighter, more compact and less expensive to manufacture.

SUMMARY OF THE INVENTION

The present invention provides an assembly comprising an electric motor within an electric motor case and a driveline support. The electric motor comprises a stator and a rotor. The rotor is connected to a rotor shaft. The driveline support comprises a hub rotatably attached to a housing by a package bearing. The electric motor case is attached to the housing and supports the stator. The rotor shaft is attached to the hub and supported solely by the package bearing of the driveline support. A shoulder portion of the rotor shaft abuts an end of the hub such that a desired air gap is maintained between the rotor and the stator.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

The present invention comprises an integral driveline support and electric motor assembly wherein the motor does not require a bearing apart from the bearing of the driveline support. The bearing is preferable a standard package wheel bearing comprising two rows of tapered rollers that handle both radial and axial loads placed upon the bearing and requires no adjustment after assembly. While the bearing is described as using tapered rollers as the rolling elements, other types of rolling elements, such a balls, are within the scope of the present invention if such rolling elements are capable of withstanding both radial and axial loads. While the following description is made with respect to a vehicle wheel bearing, such a limitation is not a necessary element of the present invention, unless so required by the claims.

Figure 1:
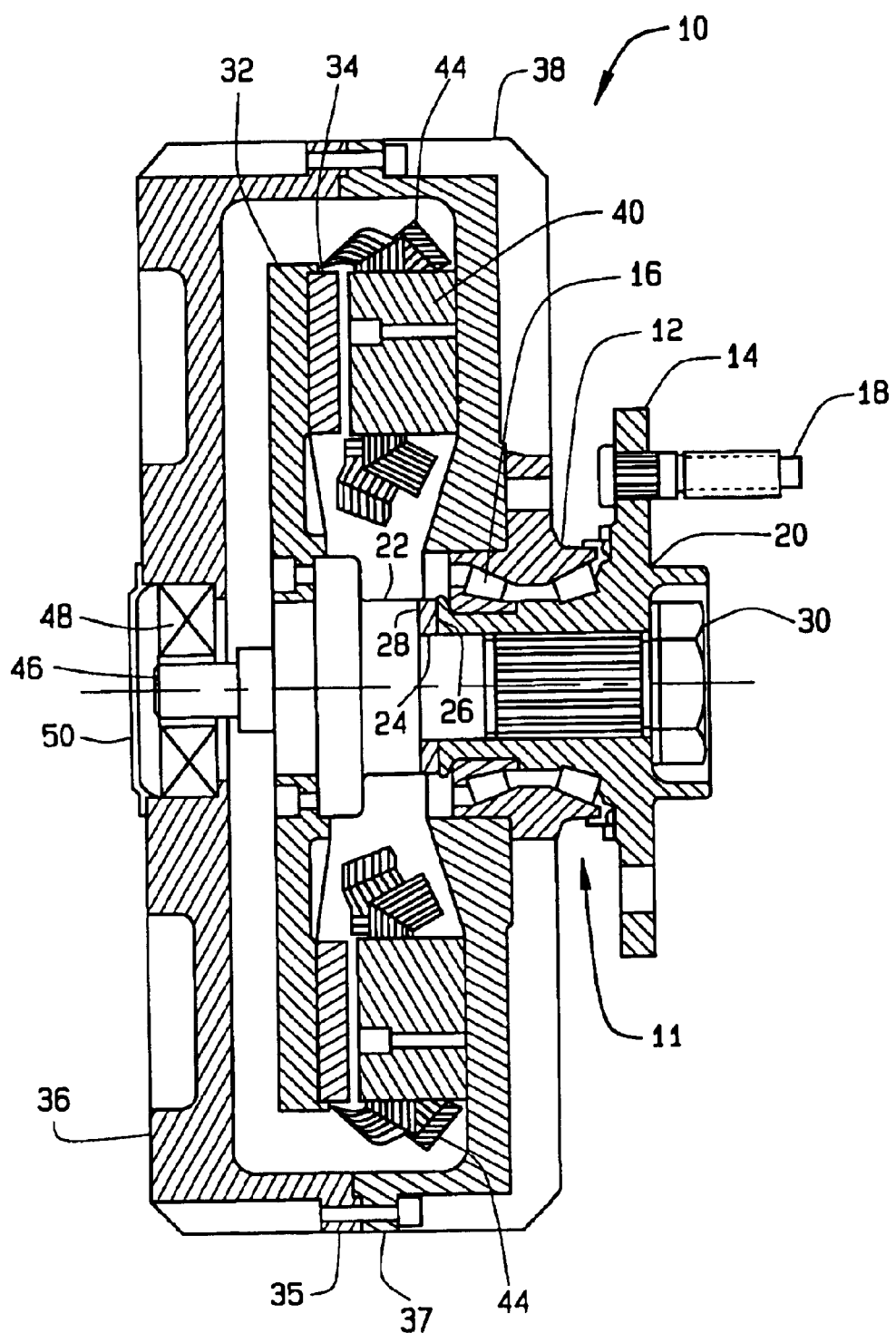
FIG. 1 is a section view of an integral driveline bearing and axial flux motor according to an embodiment of the present invention.

Referring to FIG. 1, the assembly 10 comprises a package wheel bearing 111 of conventional design. The wheel bearing 11 comprises a housing 12 and a hub 14. Located between the housing 12 and the hub 14 are a plurality of rollers 16 that allow the hub 14 to rotate within the housing 12. The hub 14 may be attached to a wheel (not shown) with lugs 18.

Figure 2:
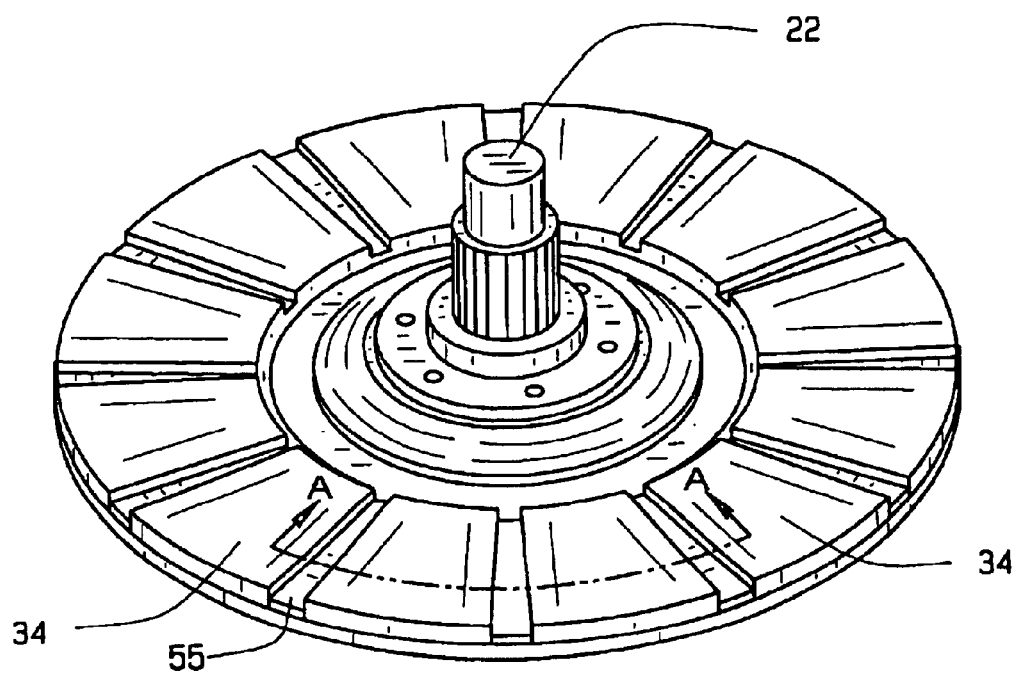
FIG. 2 is a perspective view of a rotor of an axial flux electric motor according to an embodiment of the present invention.
Figure 3:
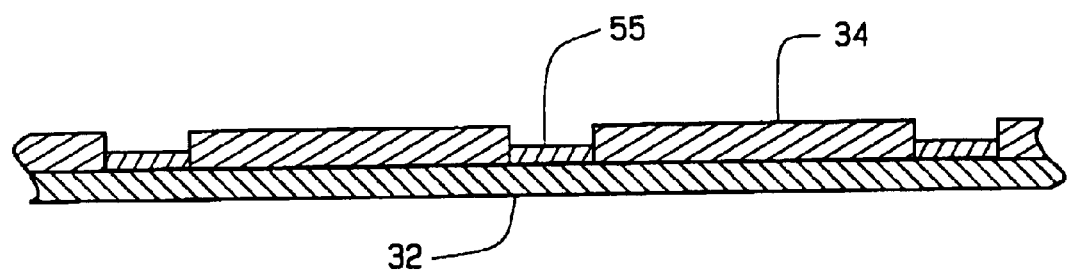
FIG. 3 is a section view of the rotor of FIG. 2 along line A-A.

Referring to FIGS. 1-3, the hub 14 further defines a splined interior bore 20 for accepting a splined shaft 22. An air gap washer 24 is located between an end 26 of the hub 14 and a shoulder 28 of the shaft 22. The thickness of the air gap washer 24 may be varied to adjust an air gap of the axial flux motor, further described below. The hub 14 is attached to the shaft 22 by a nut 30 and the mating splines of the hub 14 and the shaft 22 prevent relative rotation therebetween. Attached to the opposite end of the shaft 22 from the hub 14 is a rotor 32. The rotor 32 may be made from low carbon steel. The rotor 32 has several permanent magnets 34 attached by an acrylic adhesive, such as LOCTITE MULTIBOND acrylic adhesive available from the Loctite Corporation, Rocky Hill, Conn. The magnets 34 are spaced apart by nonmetallic spacers 33. The magnets 34 are preferably neodymium-iron-boron (Nd—Fe—B) type permanent magnets and the number of magnets determines the number of poles of the motor (i.e. if twelve magnets are adhered to the rotor, the motor has twelve poles). The magnets 34 are attached to the rotor 32 with their north-seeking faces and south-seeking faces alternatingly outwardly arranged.

Figure 4:
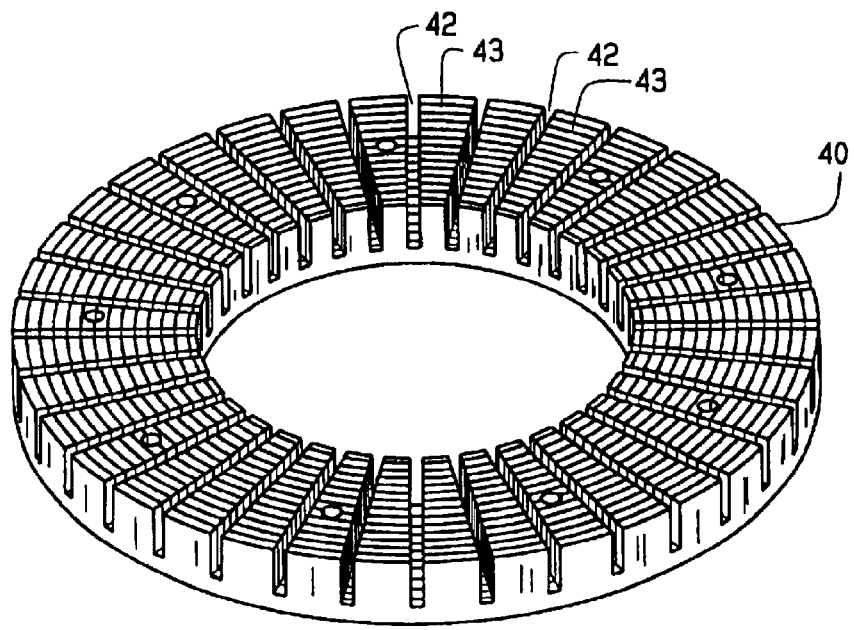
FIG. 4 is a perspective view of a stator according to an embodiment of the present invention.
Figure 5:
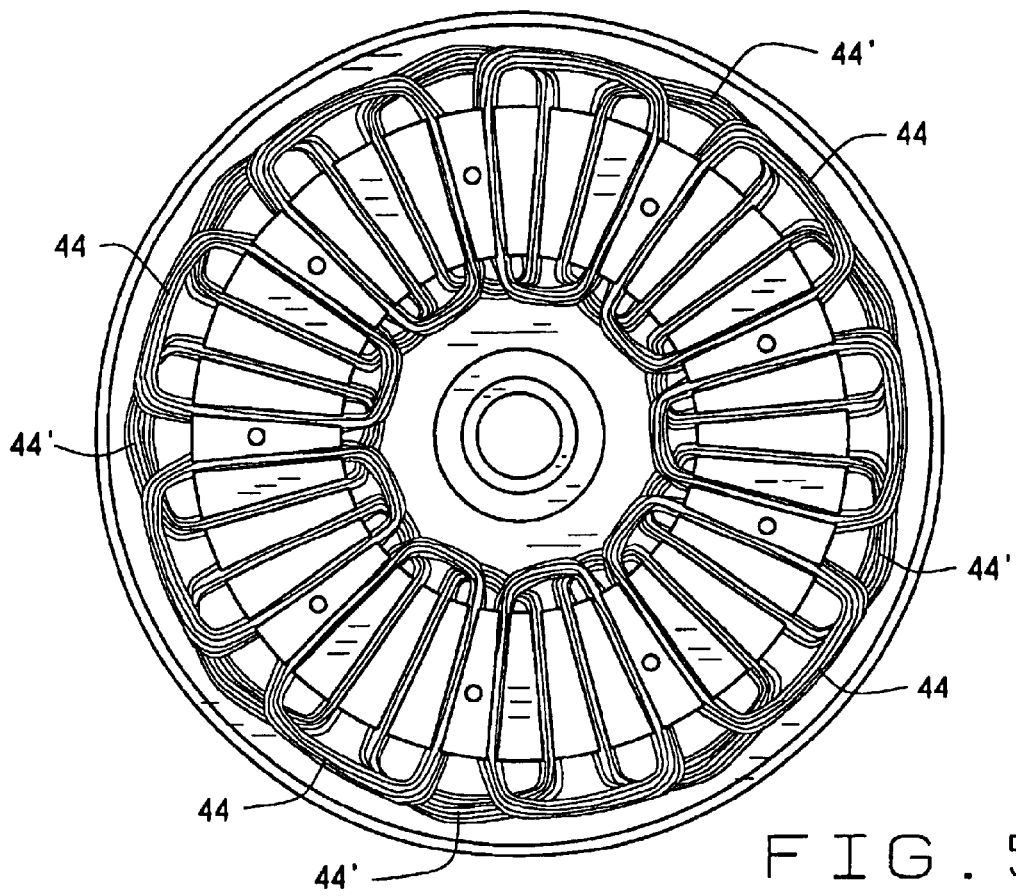
FIG. 5 is a front plan view of a stator comprising windings and attached a case according to an embodiment of the present invention.

A case 36 is attached to the housing 12. The case 36 is preferably made from an aluminum alloy. The case 36 comprises two halves 35, 37 that completely encase the rotor 32, and the exterior of the case 36 further comprises cooling fins 38. Mounted within the case 36 is a stator 40. Referring to FIG. 4, the stator 40 comprises a plurality of laminations. More specifically, the stator 40 comprises laminations of ferrous material, preferably iron, that are separated by non-conducting, non-ferrous layers to minimize losses due to eddy currents of magnetic flux within the stator 40. The stator 40 further comprises thirty-six slides 43 defined by thirty-six grooves 42. As shown in FIG. 5, conductive windings 44 comprising loops of insulated copper wire are placed within the grooves 42 and around the slides 43 such that each winding 44 forms a loop surrounding two intervening grooves 42. Another winding 44' is placed within a groove 42 a portion of which is surrounded by the first winding 44 and a groove 42 adjacent the first winding 44. In this manner, windings 44 are placed within the grooves 42 of the stator 40 until every groove 42 has been fitted with a winding 44.

Referring back to FIG. 1, the stator 40 is attached to the half 37 of the case 36. In combination, the rotor 32 and the stator 40 form an axial flux electric motor that requires no motor bearing in addition to the wheel bearing 11 that supports the automobile. Additionally, the shaft 22 includes an extension 46 that extends within a center bore of an resolver 48 mounted within one of the halves 35 of the case 36. The resolver 48 encodes the position of the shaft 22 for control circuitry (not shown) for the motor. A dust cover 50 is attached to the case 32 and covers the resolver 48.

The motor operates in a conventional manner for a brushless axial flux induction motor, and changing the thickness of the air gap washer 24 changes the air gap of the axial flux electric motor. The motor is controlled by a known electronic controller that adjusts the pulse width and frequency of current traveling through the wire loops of the stator in order to control the torque and speed of the motor and maintain current within motor limitations.

Figure 6:
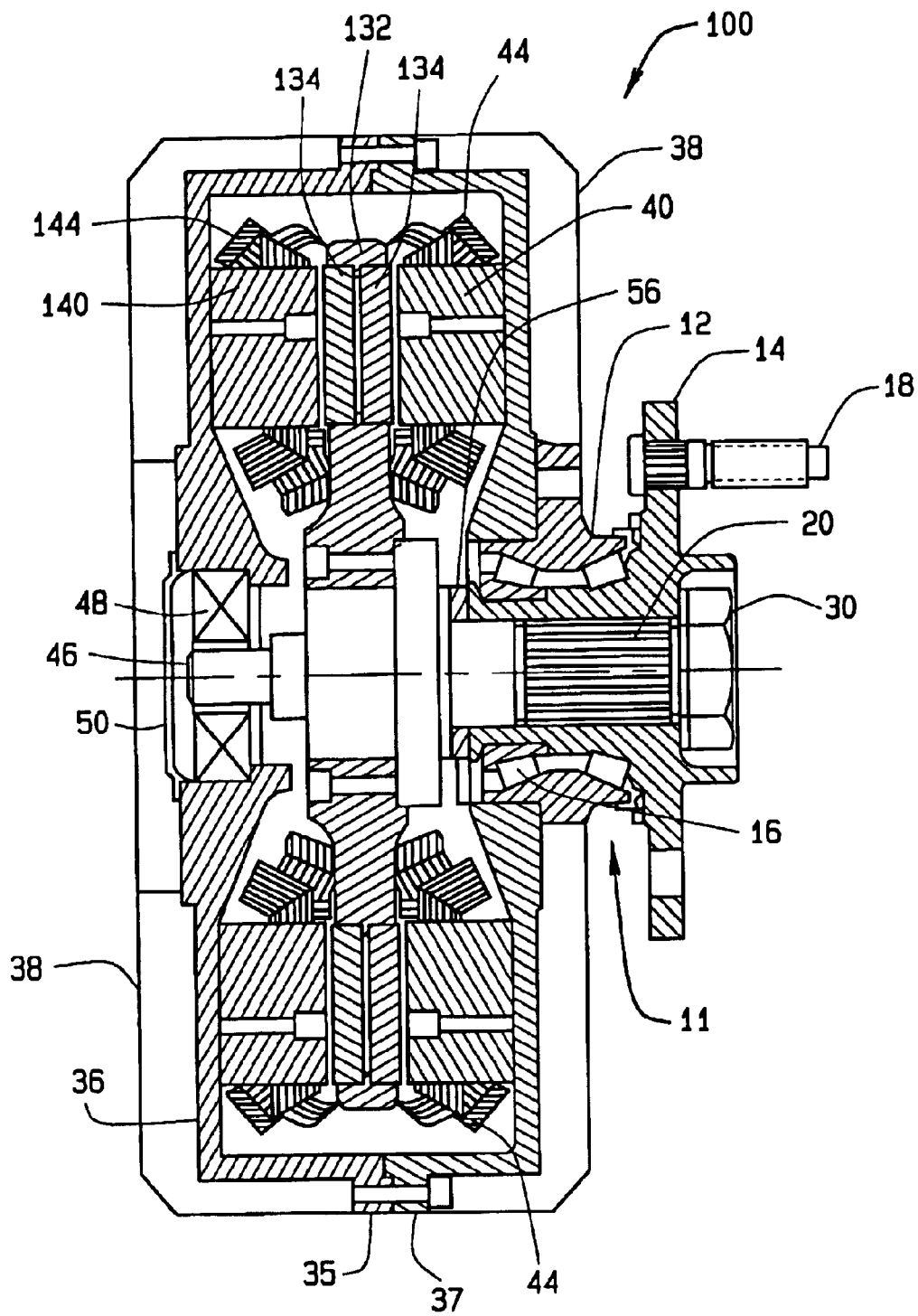
FIG. 6 is a section view of an driveline bearing and axial flux motor having two stators according to an embodiment of the present invention.

In another embodiment shown in FIG. 6, the assembly 100 comprises a rotor 132 having magnets 134 affixed to opposite sides of the rotor 132 by an adhesive. Adjacent magnets 134 on opposite sides of the rotor are aligned so that their opposite poles face outwardly from the rotor 132. In addition to the stator 40 and the windings 44 is a second stator 140 and a second plurality of windings 144 wound within the second stator 140. By adding the second stator 140 and windings 144, the output of the axial flux motor is nearly doubled.

It is to be understood that the present disclosure is to be considered only as an example of the principles of the invention. This disclosure is not intended to limit the broad aspect of the invention to the illustrated embodiment.

We claim:

1. An assembly comprising:
   an axial flux electric motor comprising a stator and a rotor, wherein the rotor is connected to a rotor shaft;
   a shaft support comprising a hub rotatably attached to a housing by a bearing;
   an electric motor case attached to the housing that supports the stator;
   wherein the rotor shaft is attached to the hub and supported solely by the bearing of the wheel support and wherein a shoulder portion of the rotor shaft abuts an end of the hub to solely maintain a desired air gap between the rotor and the stator.

2. The assembly of claim 1 wherein the bearing comprises two rows of tapered rollers.

3. The assembly of claim 2 wherein the bearing is a package bearing.

4. The assembly of claim 1 further comprising an air gap washer having a bore therethrough and disposed about the rotor shaft wherein the air gap washer is located between the hub and the shoulder portion of the rotor shaft and wherein the thickness of the air gap washer is selected such that a desired air gap is maintained between the rotor and the stator.

5. The assembly of claim 4 wherein the rotor shaft further comprises an extension opposite the shaft support that extends within a bore of a resolver and wherein the resolver is supported by the case.

6. The assembly of claim 4 wherein the rotor further comprises permanent magnets.

7. The assembly of claim 6 wherein the stator defines grooves and slides and wherein conductive windings are placed within the grooves.

8. An integral axial flux induction motor and a package wheel bearing assembly wherein the package wheel bearing comprises two rows of tapered rollers disposed between a housing and a hub end allowing the hub to rotate therein, the axial flux induction motor comprises a stator wound with conductive windings and disposed within a case attached to the housing and adjacent the stator is a rotor comprising permanent magnets attached to the hub by a rotor shaft, the rotor shaft formed such that a shoulder portion of the rotor shaft abuts an end portion of the hub to solely maintain an air gap between the rotor and the stator, wherein the rotor and rotor shaft are supported entirely by the wheel bearing.

9. The assembly or claim 8 wherein the rotor shall further comprises a rotor shaft extension extending into a bore within a resolver supported by the case.

10. The assembly of claim 8 further comprising a second stator attached to the case on an opposite side of the rotor from the first stator and wherein the rotor comprises permanent magnets on opposing sides of the rotor and the shoulder portion of the rotor shall abuts the end portion of the hub to maintain the air gap between the rotor and the first stator and a second air gap between the rotor and the second stator.

11. The assembly of claim 10 further comprising an air gap washer disposed between the shoulder of the rotor shaft and the end or the hub wherein the air gap washer is dimensioned to have a thickness that will provide a desired air gap between the rotor and the stators.

12. The assembly of claim 8 further comprising an air gap washer disposed between the shoulder of the rotor shaft and the end of the hub wherein the air gap washer is dimensioned to have a thickness that will provide a desired air gap between the rotor and the suitor.

13. An assembly comprising:
    an axial flux electric motor comprising two stators and a rotor, wherein the rotor is connected to a rotor shaft;
    a vehicle support comprising a hub rotatably attached to a housing by a bearing;
    an electric motor case attached to the housing that supports the stators;
    wherein the rotor shaft is attached to the hub and supported solely by the bearing of the wheel support and wherein a shoulder portion of the rotor shaft abuts an end of the hub such that a desired air gap is maintained between the rotor and the two stators.

14. The assembly of claim 13 wherein the bearing comprises two rows of tapered rollers.

15. The assembly of claim 14 wherein the bearing is a package bearing.

16. The assembly of claim 13 further comprising an air gap washer having a bore therethrough and disposed about the rotor shaft wherein the air gap washer as located between the hub and the shoulder portion of the rotor shaft and wherein the thickness of the air gap washer is selected such that a desired air gap is maintained between the rotor and the stators.

17. The assembly of claim 16 wherein the rotor shaft further comprises an extension opposite the vehicle support that extends within a bore of a resolver and wherein the resolver is supported by the case.

18. The assembly of claim 16 wherein the rotor further comprises permanent magnets disposed on opposite sides of the rotor.

19. The assembly of claim 18 wherein each stator defines grooves and slides and wherein conductive windings are placed within the grooves.

20. An assembly comprising:
    an axial flux electric motor comprising a stator and a rotor, wherein the rotor is connected to a rotor shaft;
    a shall support comprising a hub rotatably attached to a housing by a bearing, the hub further comprising a flange;
    an electric motor case attached to the housing that supports the stator, wherein the rotor skull is attached to the hub and supported solely by the bearing or the wheel support and wherein the bearing is located between the flange end the rotor.

21. The assembly of claim 20 wherein a shoulder portion of the rotor skull abuts an end of the hub such that a desired air gap is maintained between the rotor and the stator.

22. The assembly of claim 20 wherein the bearing comprises two rows of tapered rollers.

23. The assembly of claim 22 wherein the bearing is a package bearing.

24. The assembly of claim 20 further comprising an air gap washer having a bore therethrough and disposed about the rotor shaft wherein the air gap washer is located between the hub and the shoulder portion of the rotor shaft and wherein the thickness of the air gap washer is selected such that a desired air gap is maintained between the rotor and the stator.

25. The assembly of claim 24 wherein the rotor shaft further comprises am extension opposite the shaft support that extends within a bore or a resolver and wherein the resolver is supported by the case.

26. The assembly of claim 24 wherein the rotor further comprises permanent magnets.

27. The assembly of claim 26 wherein the stator defines grooves and slides and wherein conductive windings are placed within the grooves.

* * * * *

UNITED STATES PATENT AND TRADEMARK OFFICE
CERTIFICATE OF CORRECTION

PATENT NO. : 6,765,327 B2
DATED : July 20, 2004
INVENTOR(S) : Fukuo Hashimoto and Rao-Sheng Zhou It is certified that error appears in the above-identified patent and that said Letters Patent is hereby corrected as shown below:

Column 2,
Line 12, replace "111" with -- 11 --.

Column 3,
Line 62, replace "end" with -- and --.

Column 4,
Lines 5, 12 and 62, replace "shall" with -- shaft --.
Line 25, replace "suitor" with -- stator --.
Line 44, replace "as" with -- is --.

Column 5,
Lines 1 and 6, replace "skull" with -- shaft --.

Column 6,
Line 5, replace "am" with -- an --.
Line 7, replace "or" with -- of --.

Signed and Sealed this

Twenty-fifth Day of October, 2005

JON W. DUDAS
*Director of the United States Patent and Trademark Office*